W. H. KOCH.
RECEIPT.
APPLICATION FILED MAY 12, 1913.

1,113,220.

Patented Oct. 13, 1914.
2 SHEETS—SHEET 1.

W. H. KOCH.
RECEIPT.
APPLICATION FILED MAY 12, 1913.
1,113,220.
Patented Oct. 13, 1914.
2 SHEETS—SHEET 2.
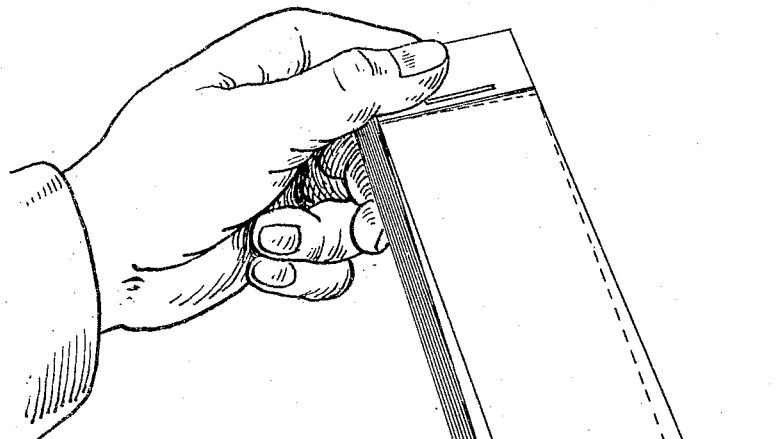
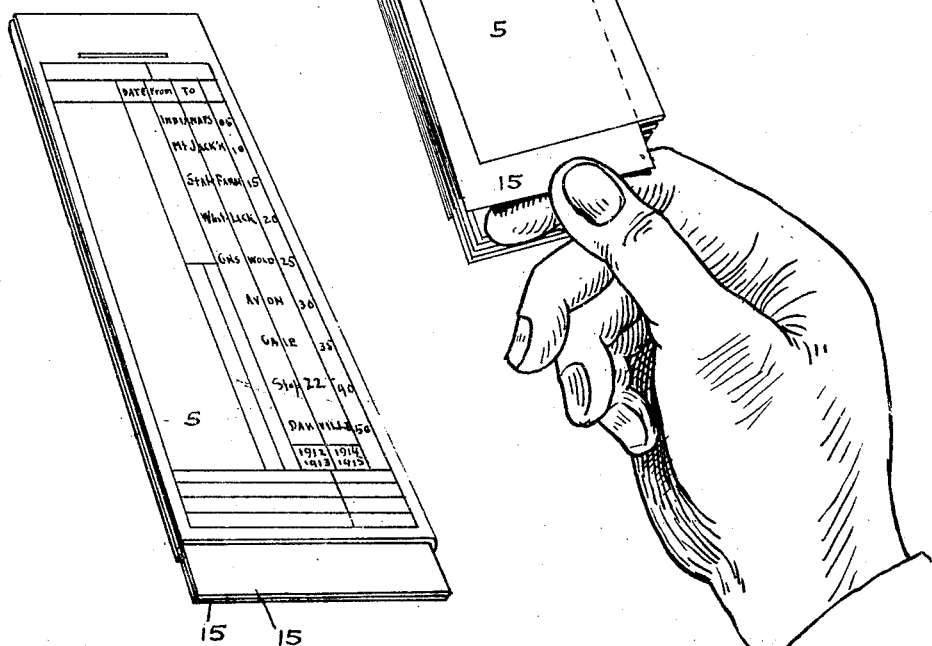
WITNESSES,
L. B. Woerner
I. L. Larson
INVENTOR.
WALTER H. KOCH,
By Minturn & Woerner
Attorneys.

UNITED STATES PATENT OFFICE.

WALTER H. KOCH, OF INDIANAPOLIS, INDIANA.

RECEIPT.

1,113,220.    Specification of Letters Patent.    Patented Oct. 13, 1914.

Application filed May 12, 1913. Serial No. 767,169.

*To all whom it may concern:*

Be it known that I, WALTER H. KOCH, a citizen of the United States, residing at Indianapolis, in the county of Marion and State of Indiana, have invented certain new and useful Improvements in Receipts, of which the following is a specification.

This invention relates to improvements in cash fare receipts, sales slips and the like, wherein three or more receipts each registering the same transaction are made so that each receipt will accurately show the transactions.

The object of the invention is to provide a passenger or customer's receipt and two or more additional receipts for the use of the party issuing same, all of which will be similarly and simultaneously marked by punch marks or other approved means by the employee issuing same, and to provide those receipts which are to be retained by the issuing party with such safeguards as to prevent counterfeiting or alteration in any manner to affect the record of the transaction.

I accomplish the objects of the invention by the means illustrated in the accompanying drawings, in which—

Figure 1 represents a development in the flat of receipts in triplicate preparatory to folding together for use. Fig. 2 represents the sheet of Fig. 1 in folded position in full lines and in flat and partly folded position in dotted lines, and indicates the direction of the folds to properly present the receipts for use. Fig. 3 represents in perspective a series of folded receipts in book form and illustrates the manner in which the passenger's receipt is removed from the companion receipts registering the same transaction, and Fig. 4 is a perspective view of a modified form showing duplicate passengers' or customers' receipts folded between a pair of receipts to be retained by the party issuing same.

Like characters of reference indicate like parts throughout the several views of the drawings.

The form illustrated in Fig. 1 represents three receipts 5, 6 and 7, each bearing the same serial number "288,326," and ruled columns bearing the same headings and data, the order of arrangement of the columns and data on the middle receipt 6 being so positioned that it will be in register with the columns and data on the other parts when the tickets are superimposed. Bearing this difference in mind the printed matter contained on each receipt is the same, except as to the instructions for disposal which are different on the passenger's receipt from those on the other two receipts, and a description of one will therefore suffice for all.

Referring to receipt 5, 8 is a space which is defined by ruled lines, within which will be the name of the party issuing the receipt and directions as to its disposal when the record is made by suitable punch marks. Next to the space 8 to the right is a column headed "Date," in the upper half 9 of which are the names of the months of the year abbreviated, and in the lower half 10 of which are the numbers from one to thirty-one inclusive, representing the days of the month. Next to the date column to the right is a ruled column containing the names of the stations of the road issuing the receipt, and for convenience in designating the direction of travel this column is divided into two parts by a longitudinal line, and each of the sub-columns thus produced are headed with appropriate words "From" and "To" so that by punching in the column marked "From" the record will indicate that the car was traveling from the station where the punch marks occurs, or if the punch mark occurs in the adjacent sub-column headed "To" it will indicate that the car was traveling toward or to the station where the punch mark occurs. To the right of the column marked 11 is the column 12 also defined by ruled lines and bearing the heading "Fare," and within the column opposite each station is the amount of the fare to that station from the station at the top of the column 11. At the lower end of the ticket are ruled spaces marked "Train number," with other spaces thereunder bearing the numerals one to nine inclusive and zero to enable the number of the train to be designated by punch marks, and to the right of this series are appropriate ruled spaces marked "Half-fare," "Dog," "Ticket" and "Pass." At the top of the columns 11 and 12 are ruled spaces containing the data "Second conductor," "Third conductor," "Fourth conductor." This data is shown as here described, merely by way of illustration, as it is obvious that changes may be made to suit varying requirements, without departing from the spirit of my invention.

The tickets or receipts 6 and 7 are separated from each other by means of a slit 13 which extends from the bottom of the ticket to a transverse perforated line 14 at a suitable distance below the top of the sheet to provide sufficient material beyond the perforation for binding the folded receipts into a book. The lower end of the sheet 7 is extended to form a finger-hold 15 to be grasped with one hand while the other end of the book is held by the other hand, and the receipt 7 detached and withdrawn in the manner indicated in Fig. 3 for presentation to the passenger, before its companion receipts 5 and 6 are removed. The receipts 5 and 6 are not separated by a scored or perforated line but they are folded together on the line 16 before being bound into a book with other receipts.

The manner of folding the receipts 5, 6 and 7 together is illustrated in Fig. 2. The receipt 7 is first folded downwardly as indicated, to the parallel position with receipt 6, and then the receipts 6 and 7, folded together, are simultaneously folded to the position shown in full lines in Fig. 2 in which the receipts 6 and 7 are under the receipt 5. When thus folded and punched in the manner indicated by the circular black punch marks in Fig. 1, the punch marks in the respective receipts will register as shown in the representation of said receipts and punch marks in Fig. 1.

The two receipts 5 and 6 are preferably allowed to remain in the book after all three have been simultaneously canceled and until the end of the trip, the receipt 7 being removed and delivered to the passenger at the time of cancellation, and the receipts 5 and 6 after their detachment are forwarded by the conductor to the auditor or other designated custodian of the road, without being detached from each other.

Because of the reverse order of the punch marks in the two receipts 5 and 6 and the integral union of the two receipts it will be impossible to counterfeit or alter them by first removing receipt 7 and punching it different from the other two and a check upon the conductor's work in punching the report is secured through the triplicate receipt 7 which is punched at the same time that receipts 5 and 6 are punched and is then given to the passenger for his immediate inspection and verification with destination and the fare paid.

In some cases it is desirable to provide more than one detachable receipt, as for example, where the conductor or other person making the receipt is to retain one of the punched tickets, and in that case the sheet will be suitably extended to provide an additional removable receipt to the right of receipt 7 and it and the receipt 7 will have end extensions 15 to project in the manner shown in the modification illustrated in Fig. 4. The two projecting receipts will be simultaneously removed after being punched. This modified form of my invention is applicable to department store and other use, in which case the rulings and words on the receipts will be suitably varied for the entry of purchases.

I have shown the receipt as being bound at its narrow end opposite the projection 15 but this order may be reversed by placing the binding at the bottom of the ticket and the projections at the top, or the projections may be at the side opposite the folded edges.

While I have described my invention with more or less minuteness as regards details of construction and arrangement, and as being embodied in certain precise forms, I do not desire to be limited thereto unduly or any more than is pointed out in the claims. On the contrary, I contemplate all proper changes in form, construction and arrangement, the omission of immaterial elements and the substitution of equivalents, as circumstances may suggest or necessity render expedient.

I claim:

1. The combination with a pair of tickets formed out of the same sheet and folded together longitudinally of the ticket, a third ticket also formed out of the same sheet as the other two and folded in between said first two folded tickets, all of said tickets when folded as above described being bound together at one of their ends, said third ticket being separated by a slot from its adjacent ticket, and each of said tickets having columns and data so positioned on their several parts that they will be in register when the tickets are folded.

2. The combination with a pair of tickets formed out of the same sheet and longitudinally folded together, of the third ticket also formed out of the same sheet and folded in between said first two folded tickets, all of said tickets when folded as above described being bound together at one of their ends, said third ticket being perforated between its body portion and said binding and separated from its adjacent ticket by a slot extending from said perforation longitudinally of the ticket, each of said tickets having columns and data so positioned on their several parts that they will be in register when the tickets are folded.

3. The combination with a pair of tickets formed out of the same sheet and folded together longitudinally, of a third ticket also formed out of the same sheet and folded in between said first two folded tickets, all of said tickets when thus folded being bound together at one of their ends, said third ticket being perforated between its body portion and said binding and separated from its adjacent ticket by a slot extending from said perforation longitudinally of the ticket and being longer than the other tickets to facilitate its removal from said other two tickets, each of said tickets having columns and data so positioned on their several parts that they will be in register when the tickets are in said folded condition.

In witness whereof, I have hereunto set my hand and seal at Indianapolis, Indiana, this, 2nd day of May, A. D. one thousand nine hundred and thirteen.

WALTER H. KOCH. [L. S.]

Witnesses:
F. W. WOERNER,
I. L. LARSON.